(12) United States Patent
Jacob et al.

(10) Patent No.: US 10,241,269 B1
(45) Date of Patent: Mar. 26, 2019

(54) GRATING COUPLERS WITH MULTIPLE CONFIGURATIONS

(71) Applicant: GLOBALFOUNDRIES INC., Grand Cayman (KY)

(72) Inventors: Ajey Poovannummoottil Jacob, Watervliet, NY (US); Yusheng Bian, Ballston Lake, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/974,252

(22) Filed: May 8, 2018

(51) Int. Cl.
*G02B 6/124* (2006.01)
*G02B 6/12* (2006.01)

(52) U.S. Cl.
CPC .... *G02B 6/124* (2013.01); *G02B 2006/12061* (2013.01); *G02B 2006/12147* (2013.01)

(58) Field of Classification Search
None
See application file for complete search history.

(56) References Cited

U.S. PATENT DOCUMENTS

| | | |
|---|---|---|
| 4,011,009 A | 3/1977 | Lama et al. |
| 4,079,411 A | 3/1978 | Engelbrecht et al. |
| 5,657,407 A | 8/1997 | Li et al. |
| 5,663,592 A | 9/1997 | Miyazawa et al. |
| 8,824,842 B2 * | 9/2014 | Matsumoto ............ B82Y 20/00 385/32 |
| 2015/0063753 A1 * | 3/2015 | Evans ...................... G02B 6/34 385/37 |

OTHER PUBLICATIONS

Wei Ang et al., "Grating couplers using silicon-on-insulator", SPIE Proceedings vol. 3620, Jan. 1999, 8 pages.
Lee et al., "The optimization of sawtooth gratings using RCWA and its fabrication on a slanted silicon substrate by fast atom beam etching", Journal of Micromechanics and Microengineering, Mar. 5, 2008, 9 pages.
Wan et al., "RCWA-EIS method for interlayer grating coupling", Applied Optics, Jul. 25, 2016, vol. 55, Issue 22, 9 pages.
Sodagar et al., "High-efficiency and wideband interlayer grating couplers in multilayer Si/SiO2/SiN platform for 3D integration of optical functionalities", Optics Express, vol. 22, Issue 14, Jul. 1, 2014, 11 pages.
Sacher et al., "Wide bandwidth and high coupling efficiency Si3N4-on-SOI dual-level grating coupler", Optics Express vol. 22, Issue 9, Apr. 29, 2014, 10 pages.
Ang, et al., "Highly efficient unibond silicon-on-insulator blazed grating couplers", Applied Physics Letters, vol. 77, 2000, 4 pages.

* cited by examiner

*Primary Examiner* — Jerry Rahll
(74) *Attorney, Agent, or Firm* — Yee Tze Lim; Andrew M. Calderon; Roberts Mlotkowski Safran Cole & Calderon P.C.

(57) ABSTRACT

The present disclosure relates to semiconductor structures and, more particularly, to grating couplers with multiple configurations and methods of manufacture. A structure includes: a grating coupler having a sawtooth configuration provided over a semiconductor slab; and a back end of line (BEOL) stack over the sawtooth configuration of the grating coupler.

17 Claims, 9 Drawing Sheets

GRATING COUPLERS WITH MULTIPLE CONFIGURATIONS

FIELD OF THE INVENTION

The present disclosure relates to semiconductor structures and, more particularly, to grating couplers with multiple configurations and methods of manufacture.

BACKGROUND

Grating couplers are commonly used in integrated optics for coupling light between integrated on-chip photonic waveguide structures and optical fibers. The grating couplers can couple light to and from the chip at any location, but the bandwidth can be limited due to the dispersive operating principle of the grating couplers.

Grating couplers can be formed in many different ways. For example, grating couplers can having a single-layer SiN top cladding (for products) or without the SiN cladding (used for wafer-level testing). Grating couplers with nitride top cladding suffer from limited coupling efficiency due to the additional reflection induced by the nitride cladding. The non-optimized top SiN top cladding will dramatically reduce the overall coupling efficiency of the photonic device.

SUMMARY

In an aspect of the disclosure, a structure comprises: a grating coupler having a sawtooth configuration provided over a semiconductor slab; and a back end of line (BEOL) stack over the sawtooth configuration of the grating coupler.

In an aspect of the disclosure, a structure comprises: a semiconductor material; a dielectric material above the semiconductor material; a patterned grating coupler comprising a sawtooth configuration with a gap provided between teeth of the sawtooth configuration, the patterned grating coupler being provided above the semiconductor material and in the dielectric material; and a back end of line (BEOL) stack over the dielectric material.

In an aspect of the disclosure, a method comprises: forming a grating coupler having a sawtooth configuration provided over a semiconductor slab; and forming a back end of line (BEOL) stack over the sawtooth configuration of the grating coupler.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to grating couplers with multiple configurations and methods of manufacture. More specifically, the grating couplers can include sawtooth configurations or variations thereof. In embodiments, the sawtooth configurations will enhance the coupling and/or reflection of light into a waveguide structure. Also, advantageously, by using the grating couplers described herein it is now possible to provide high-efficiency tunable grating couplers, i.e., improved efficiency of grating couplers (e.g., polysilicon, KG, nitride-based, etc. devices), for amongst other devices, Si photonics technologies and other photonics technologies involving grating couplers.

In embodiments, the grating couplers described herein include patterned grating couplers composed of polysilicon material lined with SiN or variations thereof, located below a back end of line (BEOL) stack. The pattern of the grating couplers are provided in a sawtooth configuration, as an example. In embodiments, the grating couplers can be composed of SiN, polysilicon with a SiN liner as examples. Moreover, a cladding layer can be located above the BEOL stack in a single planar layer or multilayer stack with properly designed thicknesses that minimize the reflection at the targeted wavelength range. The added SiN layer(s) naturally integrates with CMOS technology and other current technology platforms.

The grating couplers of the present disclosure can be manufactured in a number of ways using a number of different tools. In general, though, the methodologies and tools are used to form structures with dimensions in the micrometer and nanometer scale. The methodologies, i.e., technologies, employed to manufacture the grating couplers of the present disclosure have been adopted from integrated circuit (IC) technology. For example, the structures are built on wafers and are realized in films of material patterned by photolithographic processes on the top of a wafer. In particular, the fabrication of the grating couplers uses three basic building blocks: (i) deposition of thin films of material on a substrate, (ii) applying a patterned mask on top of the films by photolithographic imaging, and (iii) etching the films selectively to the mask.

Figure 1:
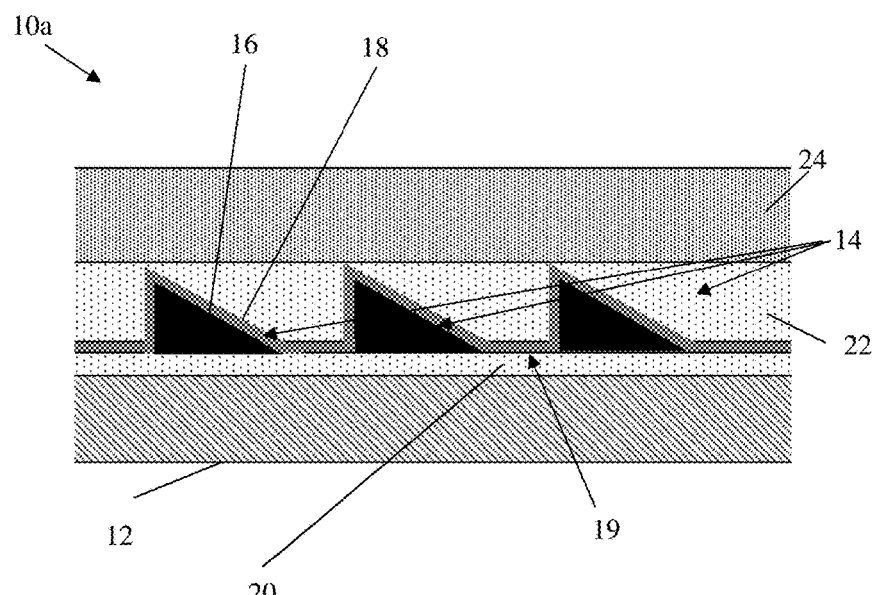
FIG. 1 shows a grating coupler, amongst other features, and respective fabrication processes in accordance with aspects of the present disclosure.

FIG. 1 shows a grating coupler, amongst other features, in accordance with aspects of the present disclosure. More specifically, the structure 10a of FIG. 1 is composed of a semiconductor slab 12 positioned below a grating coupler 14. In embodiments, the semiconductor slab 12 can be Si; although other semiconductor materials are also contemplated herein. For example, the semiconductor slab 12 can be composed of, but not limited to, Si, SiGe, SiGeC, SiC, GaAs, InAs, InP, and other III/V or II/VI compound semiconductors. The semiconductor slab 12 can also be part of a silicon on insulator (SOI) wafer, with each of the embodiments described herein including CMOS electronic components formed on or below the semiconductor slab 12 (or above the SOI wafer).

A dielectric material 20, e.g., oxide, is deposited on the semiconductor slab 12. In embodiments, the dielectric material 20 can be deposited by a conventional deposition method, e.g., chemical vapor deposition (CVD) process. Polysilicon material 16 is then deposited over the dielectric material 20, e.g., using CVD processes. In embodiments, the pitch of the patterned material 16 can range from about 500 nm to 1000 nm, with a height of about 75 nm to about 350 nm; although other dimensions are contemplated for each of the embodiments described herein. Following a patterning of the polysilicon material 16 to form a sawtooth configuration, SiN material 18 can be deposited over the patterned polysilicon material 16 and the dielectric material 20 to form the grating coupler 14 with a gap 19 provided between adjacent teeth of the sawtooth configuration.

As shown in FIG. 1, the grating coupler 14 is patterned in a sawtooth configuration (with a gap 19 between each tooth), composed of patterned polysilicon material 16 and lined with a SiN material 18. In embodiments, the sawtooth configuration can have front and rear sidewall angles at either a positive angle or a negative angle.

The sawtooth configuration of the grating coupler 14 can be fabricated using conventional lithography and etching methods known to those of skill in the art. For example, after the deposition of the polysilicon material 16, a hardmask material and resist is formed over the polysilicon material 16, with the resist exposed to energy (light) to form a pattern (opening). The hardmask material is then patterned through the opening of the resist, e.g., by a reactive ion etching (RIE) process, to expose the underlying polysilicon material 16. A crystallographic etching process with a selective chemistry is used to form a plurality of V-shaped trenches within the polysilicon material 16, e.g., to a certain desired depth. The hardmask material and resist can then be removed by a conventional oxygen ashing process and other known etchants, followed by an oxide fill in the V-shaped trenches and polishing step (e.g., chemical mechanical polishing (CMP)).

A second hardmask material and resist are formed over the patterned polysilicon material 16 and the oxide fill material. By using a lithography and etching process, the second hardmask material is patterned to expose the oxide fill material on one side of the V-shaped trench. The exposed oxide fill material is then removed by an anisotropic etching process, leaving oxide fill material on a single side of the V-shaped trench. After removal of the second hardmask material and the resist, poly material is deposited in the side of the V-shaped trench (which had the oxide removed). The remaining oxide fill material is then removed, resulting in a sawtooth configuration. The liner material 18, e.g., SiN, can then be deposited over the patterned polysilicon material 16, e.g., forming the grating coupler 14.

Still referring to FIG. 1, a dielectric material 22 is deposited on the liner material 18 (SiN) using, e.g., CVD processes. A back end of line (BEOL) multilayer stack 24 is formed over the dielectric material 22. The BEOL stack 24 can include any back end of line structures, e.g., wiring structures, interconnects, etc.

Figure 2:
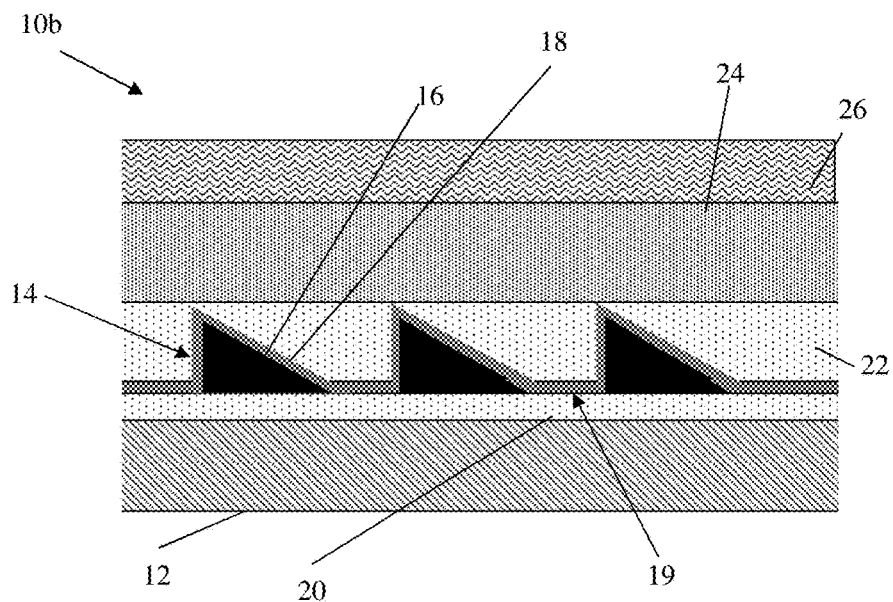
FIG. 2 shows the structure of FIG. 1 with a cladding layer, amongst other features, and respective fabrication processes in accordance with additional aspects of the present disclosure.

FIG. 2 shows the structure of FIG. 1 with a cladding layer 26 over the BEOL stack 24. In embodiments, the cladding layer 26 can include one or more layers of patterned or non-patterned SiN material. For example, the cladding layer 26 can include a single or multiple layers of material, e.g., SiN material, dielectric material (e.g., oxide), and SiN material. In embodiments, the SiN layers can have a thickness in the range of about 100 nm to 3 μm; whereas, the dielectric material (e.g., oxide) can have a thickness in the range of about 10 nm to 1 μm. It should be recognized, though, that the thicknesses of the layers, e.g., SiN/oxide, can be different for each layer, with the values preferably falling within the above-noted range depending on the particular constructive or destructive interference required for a specific wavelength of light. As should also be understood by those of skill in the art, in operation, light from a fiber optic will be emitted through the cladding layer 26, BEOL stack 24, grating coupler 14 and semiconductor slab 12 into a waveguide structure (not shown).

FIGS. 3A-3D show different configurations of a patterned semiconductor slab under a grating coupler, amongst other features, and respective fabrication processes in accordance with additional aspects of the present disclosure. More specifically, in FIG. 3A, the structure 10*c* includes a patterned semiconductor slab 12' formed by conventional lithography and etching methods known to those of skill in the art. In embodiments, the pattern 12' can be a stepped configuration.

Figure 3A:
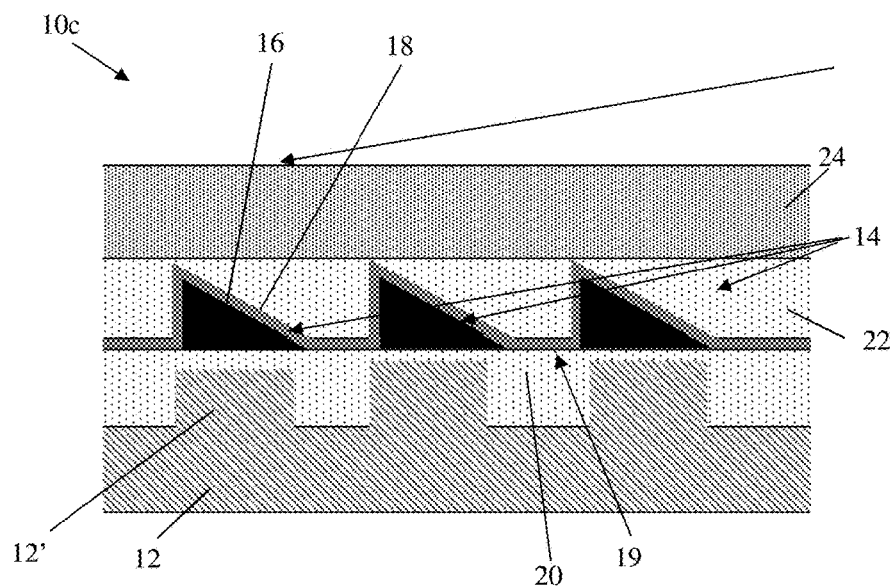
FIGS. 3A-3D show different configurations of a patterned semiconductor slab under a grating coupler, amongst other features, and respective fabrication processes in accordance with additional aspects of the present disclosure.
Figure 4A:
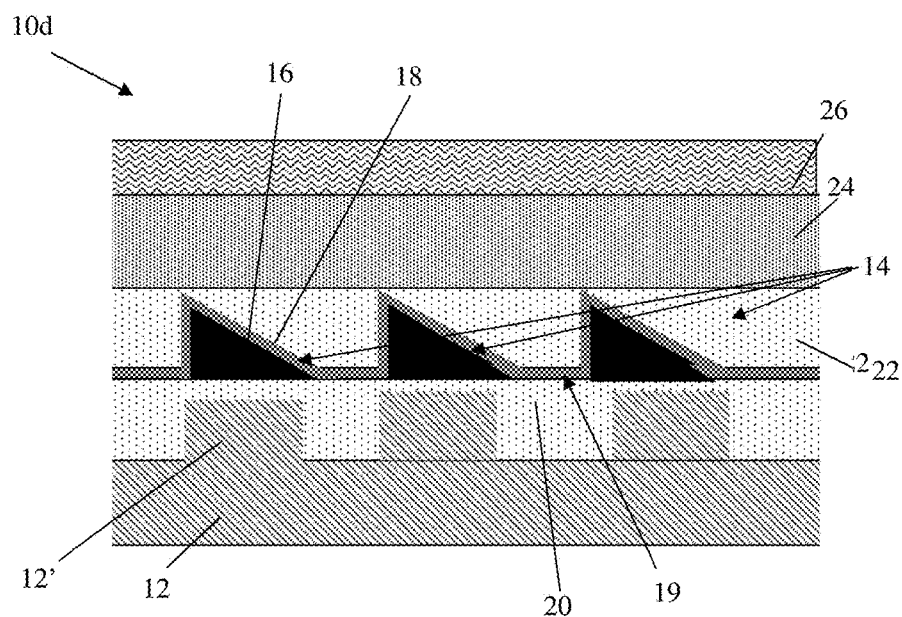
FIGS. 4A-4D shows the structures of FIGS. 3A-3D with a cladding layer, amongst other features, and respective fabrication processes in accordance with additional aspects of the present disclosure.
Figure 3B:
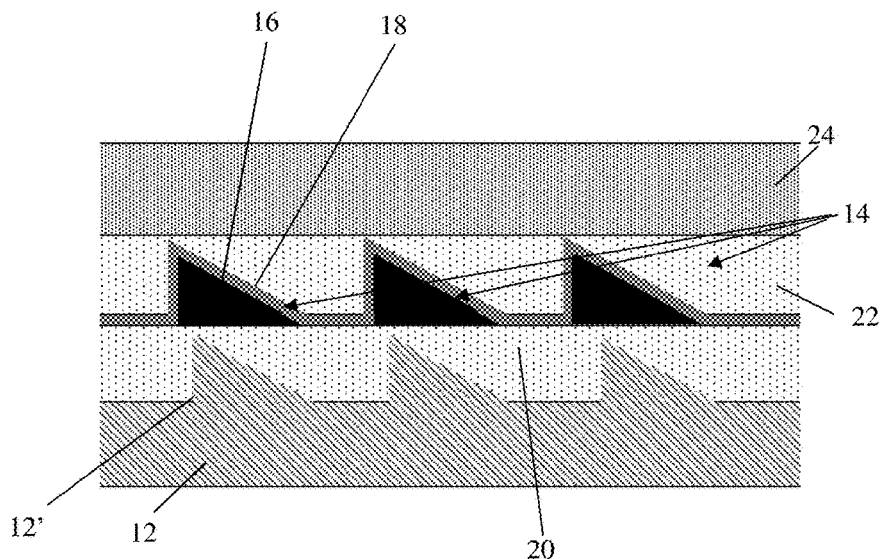
Figure 4B:
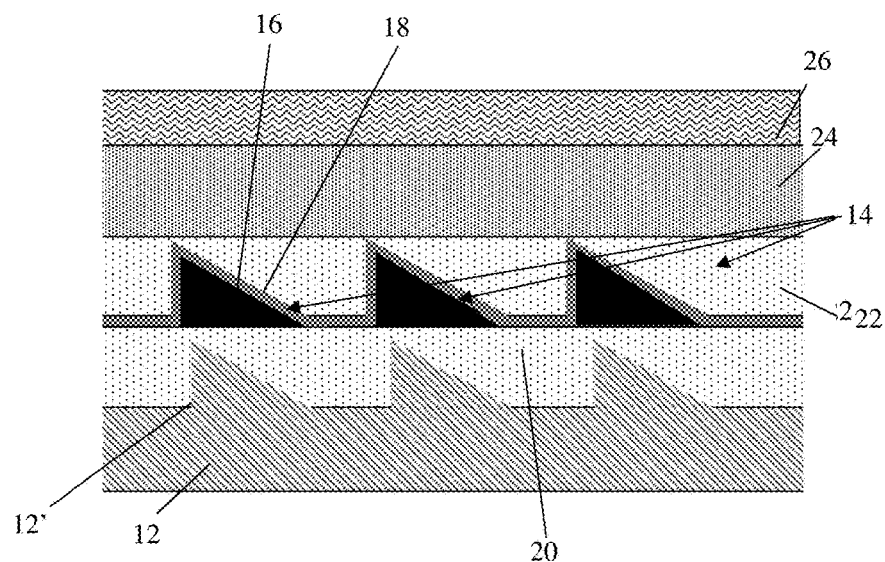
Figure 3C:
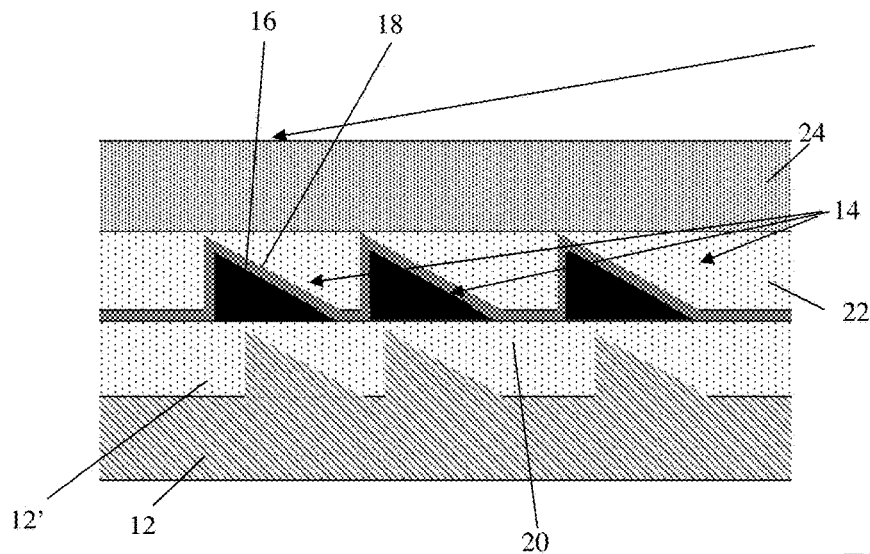
Figure 4C:
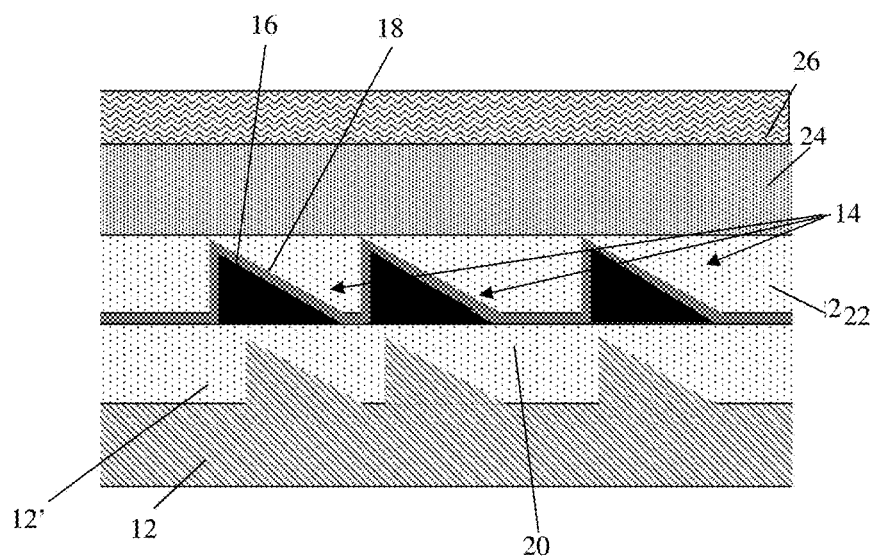
Figure 3D:
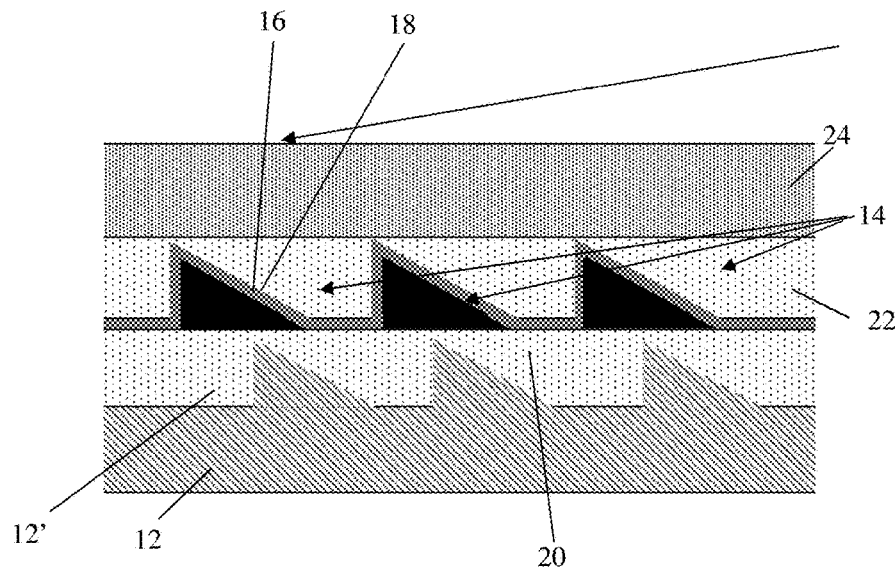
Figure 4D:
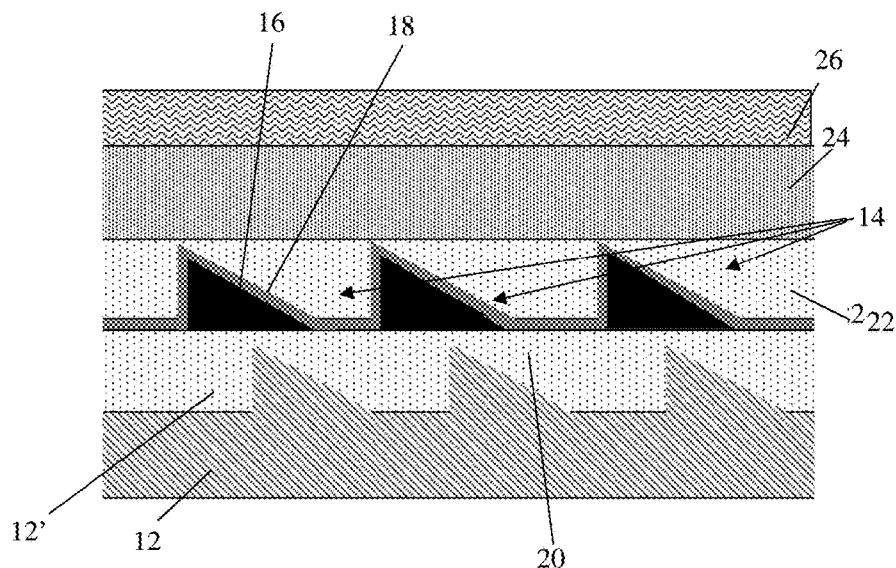

In FIGS. 3B-3D, the pattern 12' is a sawtooth configuration. As shown in FIGS. 3A-3C, the pattern 12' can align with the sawtooth configuration of the grating coupler 14; whereas, in FIG. 3D, the pattern 12' is offset from the sawtooth configuration of the grating coupler 14. In any of these embodiments, the sawtooth configuration of the grating coupler 14 and/or pattern 12' can be, e.g., periodic (repeating at regular intervals as shown in FIGS. 3A, 3B and 3D) and/or non-periodic (repeating at irregular intervals or asymmetrical as shown in FIG. 3C). Also, each of the embodiments show a gap 19 is provided between each tooth of the grating coupler 14. After the patterning process of the gating coupler 14, the fabrication processes continue with respect to that shown and described with respect to FIG. 1.

FIGS. 4A-4D show the structures of FIGS. 3A-3D with a cladding layer and respective fabrication processes in accordance with additional aspects of the present disclosure. More specifically, in FIGS. 4A-4D, the structure 10*d* includes a patterned semiconductor slab 12' in, e.g., a stepped configuration or sawtooth configuration, either aligned with or offset from the sawtooth configuration of the grating coupler 14. After the patterning process of the gating coupler 14, the fabrication processes continue with respect to that shown and described with respect to FIG. 2.

FIGS. 5A-5K show different configurations of a grating coupler used with the structures of FIGS. 1-4D and respective fabrication processes. It should be recognized by those of ordinary skill in the art that any of the configurations shown in FIGS. 5A-5K can be implemented with the different embodiments shown in FIGS. 1-4D. Moreover, as shown in many of these embodiments, the grating coupler includes a gap 19 formed between each tooth of the sawtooth configuration. Moreover, each of the different configurations described throughout the disclosure can be used for in-plane coupling in/out of silicon photonic chips.

Figure 5A:
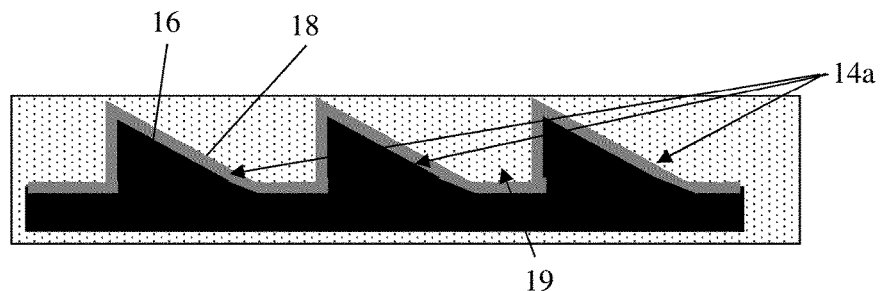
FIGS. 5A-5K show different configurations of a grating coupler used with any of the structures of FIGS. 1-4D and respective fabrication processes in accordance with aspects of the present disclosure.

In FIG. 5A, the grating coupler 14*a* includes both the polysilicon material 16 and a liner material 18. In this embodiment, though, the polysilicon material 16 is not completely etched, leaving a portion 30 of polysilicon material 16 between the sawtooth configurations. In embodiments, the portion 30 can be planar. The liner material 18 is deposited on the portion 30 and sawtooth configuration of the polysilicon material 16.

Figure 5B:
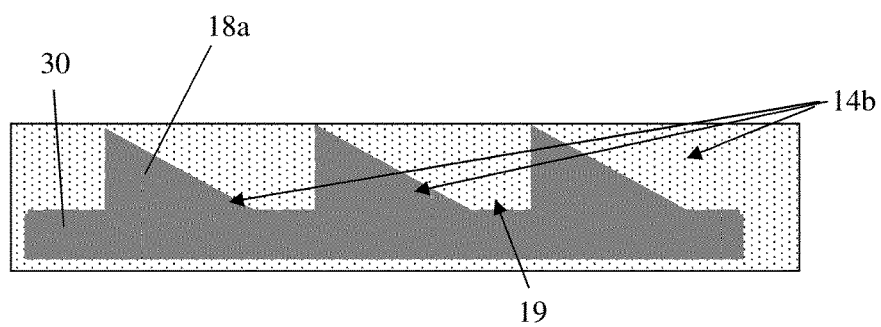

In FIG. 5B, the grating coupler 14*b* is composed of liner material 18*a*, e.g., insulator material such as SiN. In alternate embodiments, the grating coupler 14*b* can be composed of any insulating material, including undoped polysilicon. In still further embodiments, the grating coupler 14*b* can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc. In this embodiment, similar to that described with respect to FIG. 5A, the liner material 18 is not completely etched, leaving a portion 30 between the sawtooth configurations.

Figure 5C:
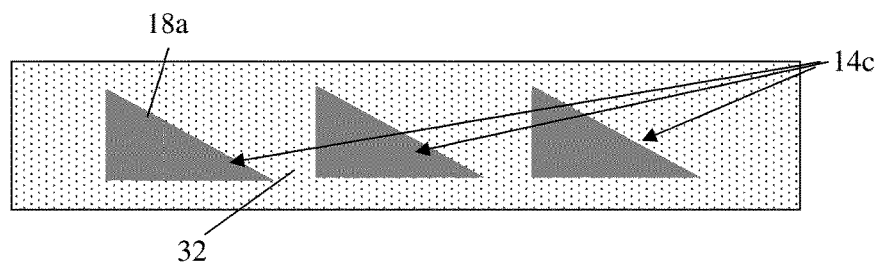

In FIG. 5C, the grating coupler 14c is composed of liner material 18a, e.g., insulator material such as SiN. In alternate embodiments, the grating coupler 14c can be composed of any insulating material, including undoped polysilicon. In still further embodiments, the grating coupler 14c can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc. In this embodiment, though, the liner material 18 is completely etched, leaving a space 32 between each sawtooth configuration.

Figure 5D:
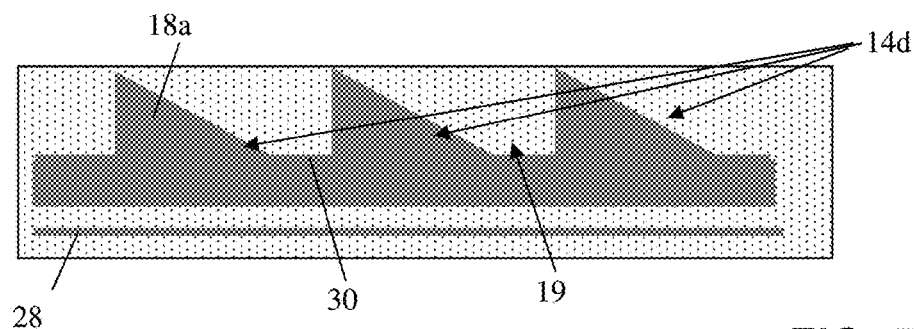

In FIG. 5D, the grating coupler 14d is located above a waveguide structure 28 composed of, e.g., insulator material such as SiN. In alternate embodiments, the grating coupler 14d can be composed of any insulating material, including undoped polysilicon. In still further embodiments, the grating coupler 14d can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc. The thickness of the grating coupler 14d can be equal to or larger than that of the waveguide structure 28. In addition, the grating coupler 14d is composed of liner material 18a, e.g., SiN, which is partly etched, leaving a portion 30 between each sawtooth configuration.

Figure 5E:
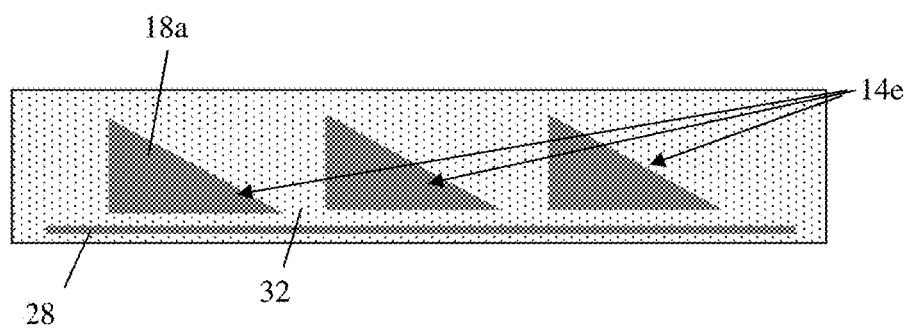

In FIG. 5E, the grating coupler 14e is located above a waveguide structure 28 composed of, e.g., insulator material such as SiN. In alternate embodiments, the grating coupler 14e can be composed of any insulating material, including undoped polysilicon. In still further embodiments, the grating coupler 14e can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc. The thickness of the grating coupler 14d can be equal to or larger than that of the waveguide structure 28. In addition, the grating coupler 14d is composed of liner material 18a, e.g., SiN, which is completely etched, leaving a space 32 between each sawtooth configuration.

Figure 5F:
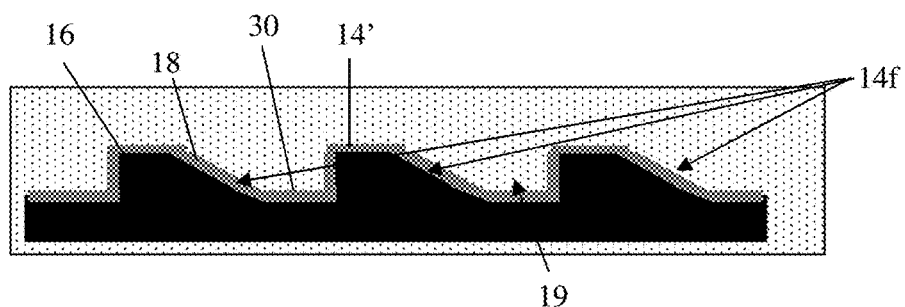

In FIG. 5F, the grating coupler 14f includes both the polysilicon material 16 and liner material 18. In this configuration, the polysilicon material 16 is patterned into a sawtooth configuration with a planar (flat) top portion 14'. Moreover, the polysilicon material 16 is not completely etched, leaving a portion 30 of polysilicon material 16 between each planar sawtooth configuration. The liner material 18 is then deposited on the sawtooth configuration 14f.

Figure 5G:
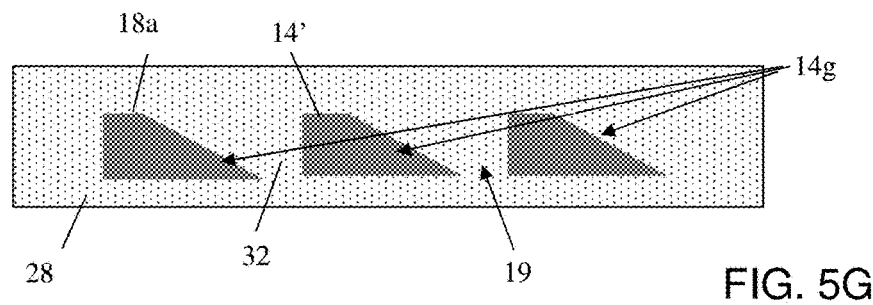

In FIG. 5G, the grating coupler 14g is composed of the liner material 18a, e.g., insulator material such as SiN, and patterned into a sawtooth configuration with a planar (flat) top portion 14'. Moreover, the liner material 18 is completely etched through, leaving a space 32 between each planar sawtooth configuration 14g. In alternate embodiments, the grating coupler 14g can be composed of any insulating material, including undoped polysilicon. In still further embodiments, the grating coupler 14b can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc.

Figure 5H:
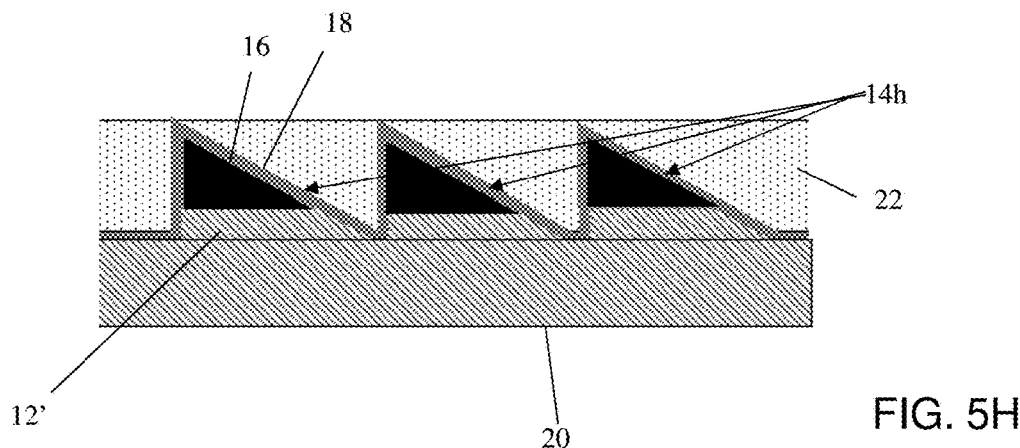

In FIG. 5H, the grating coupler 14h includes the patterned semiconductor slab 12', the polysilicon material 16 and the liner material 18. In this embodiment, the semiconductor slab 12 and polysilicon material 16 are etched together to form the sawtooth configuration, e.g., each of the patterned semiconductor slab 12', the polysilicon material 16 are part of the sawtooth configuration The liner material 18 is deposited on the sawtooth configuration of the polysilicon material 16 and the patterned semiconductor slab 12'.

Figure 5I:
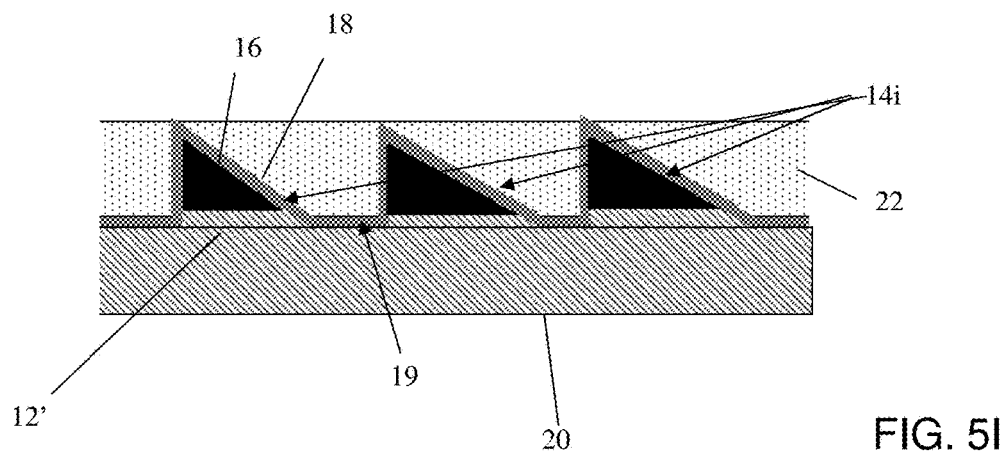

In FIG. 5I, the grating coupler 14i includes the patterned semiconductor slab 12', the polysilicon material 16 and the liner material 18. In this embodiment, though, the sawtooth configuration has spaces or gap 19 between each individual sawtooth or, as shown in FIG. 5H, each sawtooth can directly contact with an adjacent sawtooth. After the patterning process as described above, the liner material 18 is deposited on the sawtooth configuration of the polysilicon material 16 and the patterned portion of the semiconductor slab 12'.

Figure 5J:
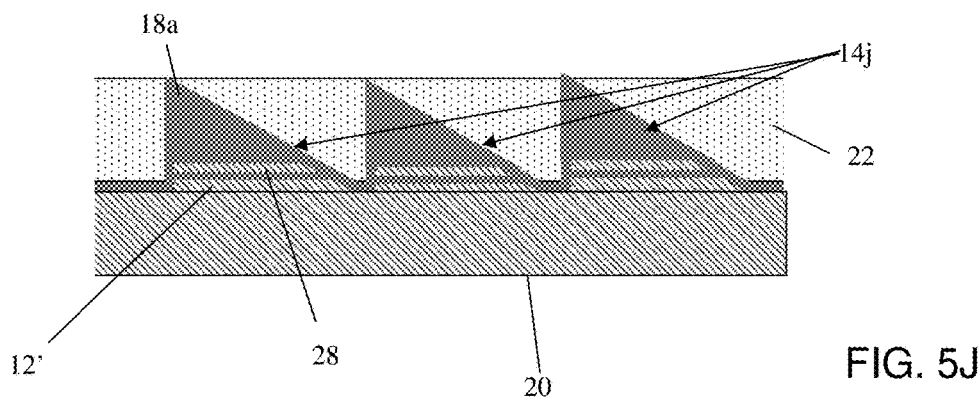

In FIG. 5J, the grating coupler 14j includes the patterned semiconductor slab 12' and the liner material 18a (e.g., SiN or other insulator material as described herein), with the waveguide structure 28 provided in the patterned semiconductor slab 12'. In this embodiment, the patterned semiconductor slab 12', liner material 18 and waveguide structure 28 are etched together to form the sawtooth configuration. In still further embodiments, the grating coupler 14j can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc.

Figure 5K:
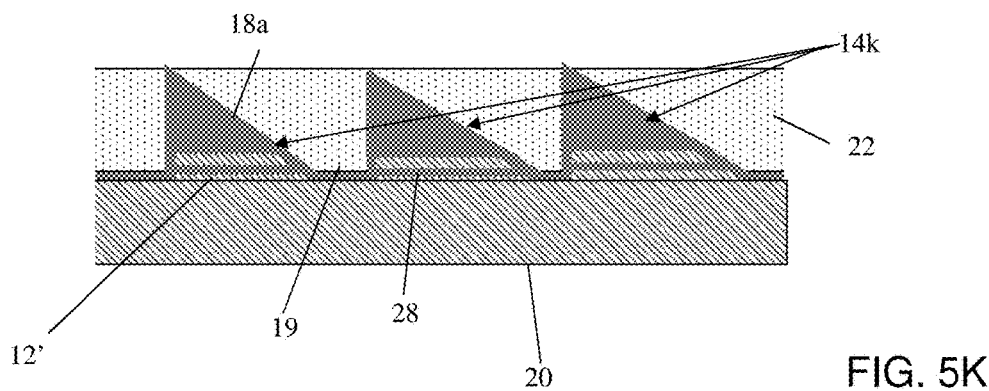

In FIG. 5K, the grating coupler 14k includes the patterned semiconductor slab 12', and the liner material 18a (e.g., SiN or other insulator material as described herein), with spaces or gap 19 between each individual sawtooth or, as shown in FIG. 5H, each sawtooth can be in direct in contact with an adjacent sawtooth. As in FIG. 5J, the waveguide structure 28 is provided in the patterned semiconductor slab 12'. In still further embodiments, the grating coupler 14k can be composed of polycrystalline or amorphous silicon (Si), polycrystalline or amorphous silicon germanium (SiGe), or a layered combination of two or more of these materials deposited by atomic layer deposition (ALD) or another deposition technique known to those of skill in the art, e.g., PVD, CVD, etc.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
    a grating coupler having a sawtooth configuration provided over a semiconductor slab; and
    a back end of line (BEOL) stack over the sawtooth configuration of the grating coupler wherein one of:
        the sawtooth configuration includes a top, planar surface for each sawtooth of the sawtooth configuration,
        the semiconductor slab includes a patterned sawtooth configuration or stepped configuration,
        the semiconductor slab includes a pattern aligned with each sawtooth of the sawtooth configuration of the grating coupler,
        the semiconductor slab includes a pattern which is offset from each sawtooth of the sawtooth configuration of the grating coupler, and
        the grating coupler is composed of the semiconductor slab and poly material, both of which form the sawtooth configuration.

2. The structure of claim 1, further comprising a cladding structure directly on the BEOL stack.

3. The structure of claim 1, wherein the grating coupler is composed of patterned polysilicon material, lined with an insulating material.

4. The structure of claim 3, wherein the patterned polysilicon material includes non-etched portions connecting each sawtooth of the sawtooth configuration, and the insulating material is provided directly on a surface of the non-etched portions and each sawtooth.

5. The structure of claim 1, wherein the grating coupler is composed of insulating material and a waveguide structure is underneath the grating coupler.

6. The structure of claim 1, wherein the grating coupler has a periodic pattern.

7. The structure of claim 1, wherein the grating coupler has a non-periodic pattern.

8. A structure, comprising:
    a semiconductor slab;
    a dielectric material on the semiconductor slab;
    a grating coupler composed of at least:
        material having a sawtooth configuration provided over dielectric material; and
        a liner over the material;
        a second dielectric material on the liner;
    a back end of line (BEOL) stack over the sawtooth configuration of the grating coupler; and
    a cladding material over the BEOL stack.

9. The structure of claim 8, wherein the the material is polysilicon material and liner is over the polysilicon material and between the sawtooth configuration on the dielectric material.

10. The structure of claim 8, wherein the grating coupler further includes patterned semiconductor slab material.

11. The structure of claim 8, wherein the grating coupler is located above a waveguide structure composed of insulator material.

12. The structure of claim 8, wherein the grating coupler is composed of undoped polysilicon.

13. The structure of claim 8, wherein the grating coupler is composed of polycrystalline or amorphous silicon (Si), polycrystalline or amorphous silicon germanium (SiGe), or a layered combination of two or more of the polycrystalline or amorphous silicon (Si), or polycrystalline or amorphous silicon germanium (SiGe).

14. A structure, comprising:
    a semiconductor material;
    a dielectric material above the semiconductor material;
    a patterned grating coupler comprising a sawtooth configuration with a gap provided between teeth of the sawtooth configuration, the patterned grating coupler being provided above the semiconductor material and in the dielectric material; and
    a back end of line (BEOL) stack over the dielectric material,
    wherein one of:
        the sawtooth configuration includes a top, planar surface for each sawtooth of the sawtooth configuration,
        the semiconductor material includes a pattern comprising one of a sawtooth configuration and stepped configuration aligned with or offset from each sawtooth of the sawtooth configuration of the grating coupler, and
        the grating coupler is composed of the semiconductor material and poly material, both of which form the sawtooth configuration.

15. The structure of claim 14, wherein the grating coupler is composed of patterned polysilicon material, lined with an insulating material.

16. The structure of claim 15, wherein the patterned polysilicon material includes non-etched portions connecting each sawtooth of the sawtooth configuration, and the insulating material is provided directly on a surface of the non-etched portions and each sawtooth.

17. The structure of claim 14, wherein the grating coupler is composed of insulating material and a waveguide structure is underneath the grating coupler.

* * * * *